MANNIE E. BORSOOK
MORTON ALPERIN
INVENTORS

BY Lyon & Lyon
ATTORNEYS

Jan. 13, 1959   M. E. BORSOOK ET AL   2,868,374
APPARATUS FOR THE PURIFICATION OF CRYSTALLINE MATERIALS
Filed April 23, 1953   3 Sheets-Sheet 2

MANNIE E. BORSOOK
MORTON ALPERIN
INVENTORS

BY Lyon & Lyon
ATTORNEYS

Jan. 13, 1959  M. E. BORSOOK ET AL  2,868,374
APPARATUS FOR THE PURIFICATION OF CRYSTALLINE MATERIALS
Filed April 23, 1953  3 Sheets-Sheet 3

MANNIE E. BORSOOK
MORTON ALPERIN
INVENTORS

BY Lyon & Lyon
ATTORNEYS

United States Patent Office 2,868,374
Patented Jan. 13, 1959

2,868,374

APPARATUS FOR THE PURIFICATION OF CRYSTALLINE MATERIALS

Mannie E. Borsook, Los Angeles, and Morton Alperin, Pasadena, Calif., assignors to Clinical Research Foundation, Los Angeles, Calif., a corporation of California Application April 23, 1953, Serial No. 350,742

16 Claims. (Cl. 209—111)

This invention relates to the purification of substances and has particular reference to an apparatus for the selection and separation of the components of mixtures of optically active materials, and of mixtures containing optically active materials.

Great difficulty has heretofore been experienced in the isolation of optically active substances, i. e., substances having a molecule containing an asymmetric atom such as carbon, nitrogen, etc. Such optically active materials have the property of rotating the plane of polarized light, and molecules of the same optically active substance are generally found in two forms: the dextro form which rotates the plane of polarized light to the right, and the laevo form which rotates the plane of polarized light to the left. For example, a solution of an amino acid such as synthesized methionine contains molecules of both forms, and upon crystallization, a mixture of dextro, laevo and racemic (non-optically active) crystals is obtained. It is often necessary for use in the fields of medicine and biochemistry to obtain the pure dextro or laevo compound, but purification methods heretofore known have involved tedious resolution or fractional crystallization procedures which, due to the low yield and time involved, result in an extremely expensive product. Similar expensive and time-consuming procedures have heretofore been required for the separation of an optically active substance from a mixture thereof and an optically inactive material or materials.

One of the principal objects of this invention is, therefore, to provide an apparatus for quickly and easily isolating pure materials from mixtures of optically active materials or from mixtures containing an optically active material.

Another object of this invention is to provide an optical apparatus for the automatic separation of mixtures of optically active crystals or from mixtures containing optically active crystals, into their respective components.

A further object of this invention is to provide an apparatus for separating into their component parts mixtures of optically active crystals or mixtures containing optically active crystals, which method and apparatus is substantially independent of crystal size and shape.

Yet another object of this invention is to provide an apparatus of the type described which permits the relatively inexpensive production of highly purified crystalline materials.

Other objects and advantages of this invention, it is believed, will be readily apparent from the following detailed description of preferred embodiments thereof when read in connection with the accompanying drawings.

Briefly, this invention comprises an apparatus wherein the following steps are carried out: separating individual crystals from a mixture of optically active crystals of substantially uniform size and shape, or from mixtures containing optically active crystals; sequentially presenting the single crystals to a source of polarized light; transmitting the light through the crystal; registering, by means of a light sensitive instrument, the lack of rotation, or the direction of rotation of the plane of transmitted polarized light; and moving the crystal to a selected position in response to the registration of the lack of rotation or the direction of rotation of the plane of polarized light. This invention also includes an apparatus for properly aligning the individual crystals for presentation to the source of polarized light.

Figure 1:
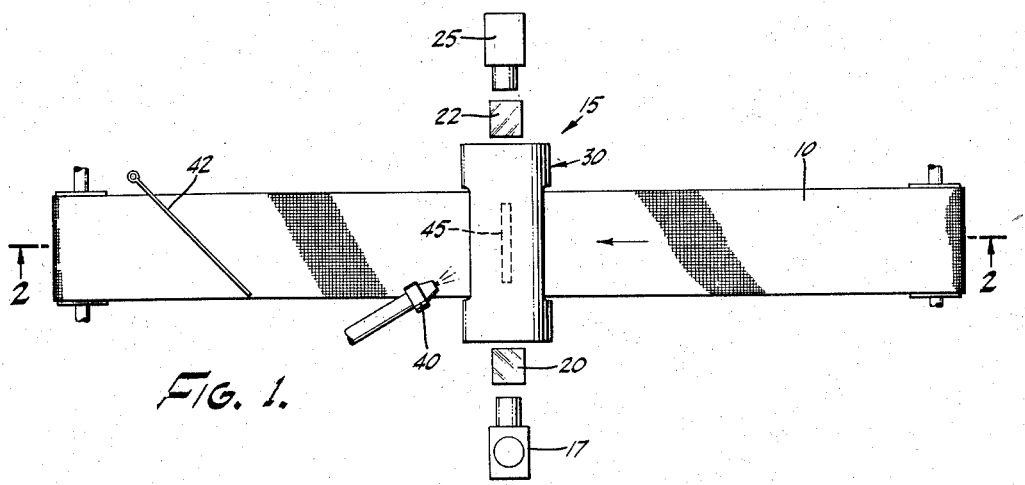
Figure 1 is a top plan view, partly diagrammatic, of an apparatus embodying a preferred form of the invention.
Figure 2:
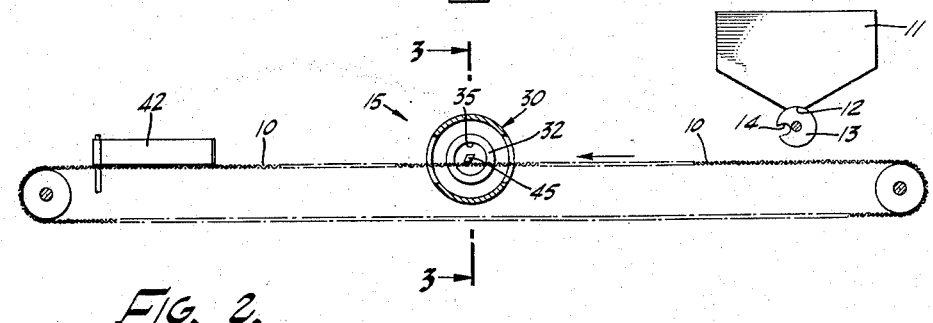
Figure 2 is a sectional elevation taken substantially on the line 2—2 of Figure 1.
Figure 3:
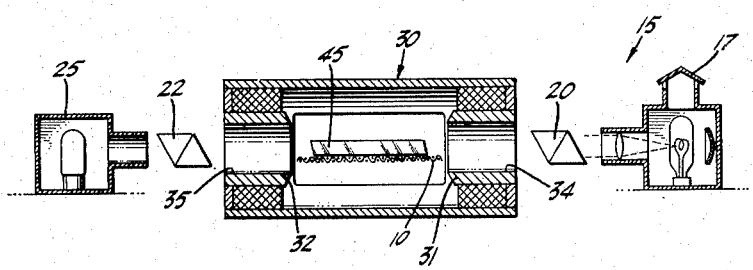
Figure 3 is a sectional view taken substantially on the line 3—3 of Figure 2.
Figure 4:
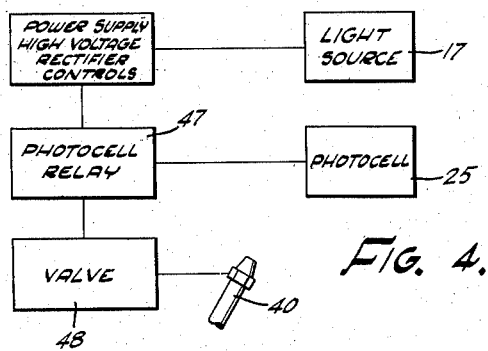
Figure 4 is a diagrammatic view illustrating the electric circuit of the apparatus of Figures 1 through 3.

Referring now to the drawings, the device of Figures 1 through 4 is adapted for use in working with optically active isotropic crystals. Crystals of this type have no optics and, therefore, exhibit no birefringence or double refraction. The effect of birefringence is so great as to normally mask the optical activity of the crystal and hence also it masks the rotation of the plane of polarized light. However, many crystals are uniaxial or have a single optic axis and when the incident light ray is parallel or perpendicular to the optic axis, there is no birefringence and the optical activity is not masked. Accordingly, in the case of crystals exhibiting birefringency, the crystal must be aligned so that it is presented to the source of polarized light with its optic axis parallel or perpendicular to the rays of polarized light. Thus it will be apparent that the apparatus of Figure 1 is also adapted for use in working with crystals of the type which may be mechanically aligned, such as uniaxial crystals having an elongated geometric shape. In such crystals, the optic axis generally extends in a longitudinal direction and, therefore, the problem of alignment is relatively simple. Crystals having no long geometric axis require somewhat more complicated alignment procedures and apparatus as will be discussed in more detail below.

The device illustrated in Figures 1 through 4 includes an endless, preferably foraminous, conveyor belt 10 continuously driven in the direction of the arrow in Figure 1 by suitable means (not shown). Mounted above one end of the belt is a crystal hopper 11 having a relatively small outlet opening 12 which is normally closed by a cylindrical feeder device 13. This latter device is provided with a pocket 14 of a size to receive a single crystal from the hopper 11 and is caused to rotate by suitable means (not shown).

Intermediate the ends of the conveyor belt 10 is the selector mechanism, generally indicated 15, which includes a preferably monochromatic light source 17. The light rays from the source are directed in a horizontal path parallel to and intersecting the top run of the belt. Means are provided for polarizing the light rays from the source 17, and as shown in the drawings, these means may include the polarizer 20, which preferably comprises a Nicol prism. On the side of the belt remote from the polarizer 20 is an analyzer 22, which also preferably comprises a Nicol prism, the analyzer being aligned with the polarizer and suitably mounted by means (not shown) for rotation about a horizontal axis. Positioned adjacent the analyzer and aligned therewith is a light sensitive device such as the photo electric cell 25. Means are provided for establishing a magnetic field across and intersecting the upper run of the belt 10, and as shown in the drawings, these means may include the electro magnet 30, the poles 31 and 32 of which are spaced on opposite sides of the upper run of the belt 10. The poles 31 and 32 are provided with axially aligned apertures 34 and 35 which are also aligned with the light rays from the source 17. From this description it will be understood that light rays from the source 17 pass horizontally first through the polarizer 20, through the aperture 34, across the upper run of the belt 10, through the aperture 35, through the analyzer 22, and thence impinge upon the photo electric cell 25.

Means are provided for moving the individual crystals to selected positions in response to a signal from the photo cell 25, and as shown in the drawings, these means may include the jet nozzle 40 supplied with compressed air from a suitable source of supply (not shown), and the stationary baffle plate 42 mounted at an angle above and closely adjacent to the top surface of the upper run of the belt 10.

In operation, a batch of crystals which have been previously classified as to size, as by screening, are placed in the hopper. Such crystals, as indicated above may comprise a racemic mixture of isotropic crystals or of uniaxial crystals having a long geometric axis, or mixtures containing one or the other type of optically active crystals and one or more types of optically inactive crystals. The analyzer has been previously adjusted in accordance with the optical activity of the particular crystal which it is desired to separate from the mixture in the hopper. For example, if it is desired to separate the laevo crystal from a mixture, the analyzer is initially rotated to a position wherein it blocks the passage therethrough of polarized light which has been transmitted through the particular laevo crystal.

The conveyor belt 10 and feeder device 13 are now started into operation, and with each revolution of the device 13 a single crystal 45 is deposited upon the belt to be thereby conveyed to the selector mechanism 15. Each individual crystal 45 is thus presented to the source of polarized light, and these light rays are transmitted through the crystal and thence blocked by, or transmitted through, the analyzer, depending upon the optical activity of the crystal. If, following the example above, a laevo crystal is presented to the source of polarized light, transmission of light rays to the photo cell 25 is minimized by the analyzer. This in turn causes the output of the photo cell to decrease and, through a suitable photo cell relay control 47, which includes an amplifier, de-energizes the electrical control valve 48 to cause a blast of air to be forced through the jet nozzle 40, blowing the laevo crystal off the belt and into a suitable receptacle (not shown) adjacent the belt. Upon rejection of the laevo crystal the output of the photo cell is again increased, thereby closing the valve on the jet nozzle 40. The presentation to the source of polarized light of a crystal other than the particular laevo crystal for which the analyzer had originally been set has no appreciable effect upon the output of the photo cell, and such a crystal will be conveyed away by the belt, striking the baffle 42 to be thereby diverted into another receptacle (not shown) adjacent the conveyor belt.

The pocket 14 is preferably elongated so that in the event that uniaxial crystals of the type having a long geometric axis are being operated upon, the individual crystals are delivered to the belt with the long crystal axis aligned perpendicular or parallel to the direction of travel of the belt. Accordingly, the crystal is presented to the source of polarized light with the crystal axis parallel or perpendicular to the light rays and hence no masking of the rotation of the plane of polarized light will be obtained.

The observed angle of rotation of the plane of polarized light, in the case of amino acid crystals, is very small, of the order of a fraction of a degree in some cases. Since the specific rotation varies inversely as the wave length of the light, it is preferred to use as the light source 17 light of the shortest possible wave length consistent with the characteristics of the photo cell and, as the light sensiitve device 25, a photo cell which is most sensitive to the wave length chosen. Additionally, we have found that the angle of specific rotation of crystals may be increased by imposing a magnetic field upon the crystal in the same direction as, and simultaneously with, the rays of incident polarized light. Maximum angles of rotation are obtained when the incident ray of light and the lines of flux are parallel and aligned to coincide with each other.

The modified form of the invention illustrated in Figures 5 through 9 is particularly adapted for use in the purification of birefringent crystals which have no particular long geometric axis, although it is to be understood that it may be effectively used for the separation of other uniaxial crystals and isotropic crystals.

Figure 9:
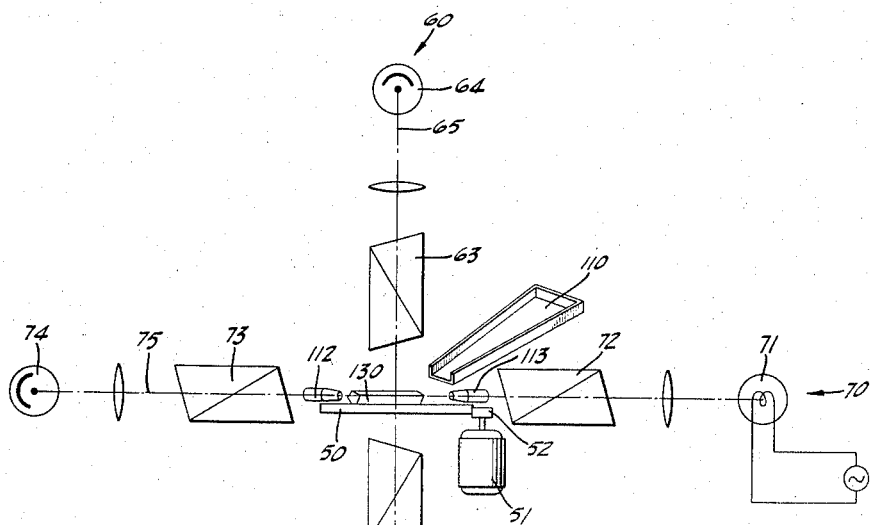
Figure 9 is a schematic view illustrating the apparatus of Figures 5-8, but with the magnet removed for clarity of illustration.
Figure 5:
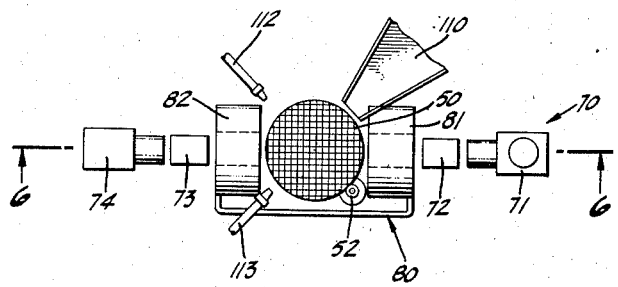
Figure 5 is a top plan view, partly diagrammatic, illustrating a modified form of the invention.
Figure 6:
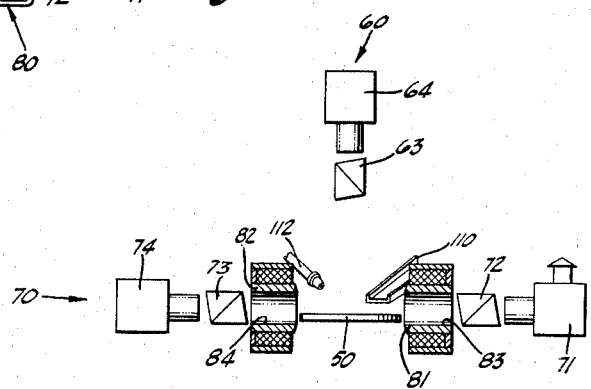
Figure 6 is a sectional view taken substantially on the line 6—6 of Figure 5.

Referring in particular to Figures 5, 6 and 9, this device includes a turntable 50 of light-transmitting material such as the wire grid construction shown. The turntable is driven at a slow rate of speed by means of the motor 51 through the transmission 52. A generally vertical crystal orienting or alignment system 60 is provided, this system comprising a light source 61 and a Nicol prism polarizer 62 below the table 50, and a Nicol prism analyzer 63 and a photo cell 64 above the table, all aligned upon an axis 65 extending vertically through the approximate center of the table. A crystal selector system 70 is also provided, consisting of a light source 71 and a Nicol prism 72 on one side of the table 50, and a Nicol prism analyzer 73 and a photo cell 74 on the other side of the table, all aligned upon a horizontal axis 75 intersecting the vertical axis 65 and parallel to and slightly above the table.

An electromagnet 80 is preferably included and is provided with poles 81 and 82 arranged to establish lines of flux aligned with and encompassing the axis 75, the poles being provided with apertures 83 and 84 through which pass the light rays from the source 71. If desired, the electromagnet may be positioned on a vertical axis with the lines of flux aligned with and encompassing the axis 65. The functions of alignment and selection would then be interchanged.

Figure 8:
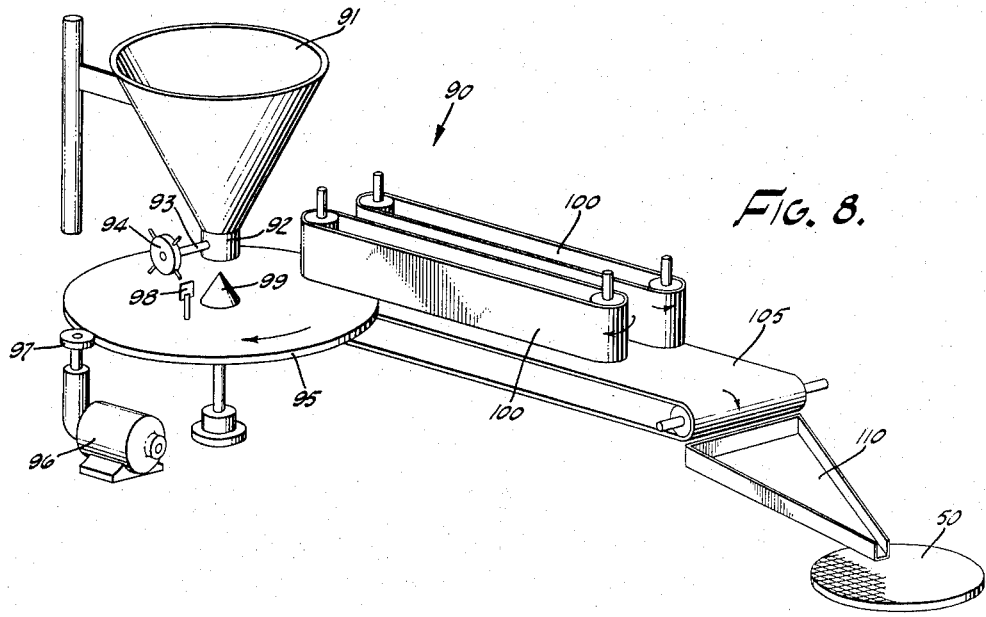
Figure 8 is a perspective view illustrating a preferred form of crystal feed mechanism for use in combination with the apparatus illustrated in Figures 5 and 6.

Means are provided for intermittently delivering previously sized single crystals to the turntable 50, and as shown best in Figure 8, these means may include the feeder device, generally indicated 90, and including a hopper 91. The outlet end 92 of the hopper is provided with a trap valve (not shown) including a valve stem 93 on which is carried a star wheel device 94. A disk 95 is provided below the outlet 92 and is driven by means of the motor 96 through the transmission 97. An upstanding arm 98 is provided on the disk for cooperation with the star wheel 94 in opening the trap valve. A center cone 99 is provided on the top surface of the disk and is vertically aligned with the outlet end 92.

A pair of vertical endless belts 100, driven in the direction of the arrows at the same rate as the peripheral speed of the disk, are mounted with their receiving ends above and closely adjacent to or in contact with the disk 95. A horizontal endless belt 105, driven in the direction of the arrow and at the same speed as the belts 100, is provided beneath the disk 95, contacting the disk and the lower edges of the belts 100. The delivery end of the belt 105 overlies a chute member 110, the outlet end of which is above the turntable 50.

Figure 7:
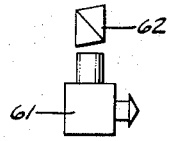
Figure 7 is a diagrammatic view illustrating the electric circuit of the apparatus of Figures 5 and 6.

Selective crystal discharge from the table 50 is provided by means of the jet nozzles 112 and 113 which are supppplied with compressed air from a suitable source (not shown), and controlled by the photo cell 74, by means of electric valves indicated 114 and 115 in Figure 7.

Referring to Figure 7, a timed switch unit 120 is provided, to which is connected the systems 60 and 70, the valves 114 and 115, and the table drive motor 51 through the motor control.

The polarizers 62 and 63 are originally set at 90° to each other. In operation, the motor 51 is energized to rotate the table 50. The motor 96 is likewise started to rotate the disk 95. With each revolution of the disk, the arm 98 actuates the star wheel 94 to discharge a single crystal from the hopper 91. The crystal strikes the cone 99 and is thus caused to move away from the center of the disk. Centrifugal force carries the crystal out to the edge of the disk whereupon it contacts the belts 100 and is carried to the chute 110 by the cooperating belts 100 and 105. A suitable stationary circular baffle (not shown) surrounds the periphery of the disk to channel the crystals into the opening between the belts. Each successive crystal 130 is deposited substantially centrally of the turntable 50 by means of the chute.

The crystal is rotated by the turntable until it is so positioned that a minimum of light is transmitted to the photo cell 64 which thereupon, through the circuit shown schematically in Figure 7, de-energizes the motor 51 to stop the table 50 and to de-energize the light source 61. It will be understood that the crystal is now oriented with its optic axis in the path of and parallel to the light rays from the light source 71. Simultaneously with the orientation of the crystal, the switch unit 120 activates the light source 71 and magnet 80. It will be understood that the analyzer 73 has previously been set in a position to minimize transmission of light to the photo cell when the type of crystal to be isolated is presented to the light source 71. Thus, in the event that the particular crystal being operated upon is of the type to be isolated, the photo cell causes the control valve 114 to be energized, forcing a blast of air through the nozzle 112 and blowing the crystal off the table 50 and into a suitable receptacle (not shown). If the crystal is not of the type to be isolated, the timed switch unit 120 energizes the valve 115, forcing a blast of air through the nozzle 113 and blowing the crystal off the table and into a second receptacle (not shown). Upon removal of the crystal, the system 70 is de-energized and the cycle is repeated, all under the influence of the switch unit 120.

Having fully described the invention, it is to be understood that it is not intended to limit the invention to the details herein set forth, but our invention is of the full scope of the appended claims.

We claim:

1. In apparatus for isolating optically active crystals from a mixture, the combination of: means for separating individual crystals from said mixture, a source of polarized light, said light being emitted in a path, means for presenting said individual crystals to said source of polarized light, means for registering the direction of rotation of the plane of polarized light transmitted through said individual crystals, and means for moving the individual crystals to a selected position in response to said registration.

2. In apparatus for isolating optically active crystals from a mixture, the combination of: means for separating individual crystals from said mixture, a source of polarized light, said light being emitted in a path, means for presenting said individual crystals to said source of polarized light, means for orienting said individual crystals with their optic axes parallel to and in the path of polarized light, means for registering the direction of rotation of the plane of polarized light transmitted through said individual crystals, and means for moving the individual crystals to a selected position in response to said registration.

3. In apparatus for isolating optically active crystals from a mixture, the combination of: means for separating individual crystals from said mixture, a source of polarized light, said light being emitted in a path, means for presenting said individual crystals to said source of polarized light, a magnetic field parallel to and coinciding with said path of polarized light, means for registering the direction of rotation of the plane of polarized light transmitted through said individual crystals, and means for moving the individual crystals to a selected position in response to said registration.

4. In apparatus for isolating optically active crystals from a mixture, the combination of: means for separating individual crystals from said mixture, a source of polarized light, said light being emitted in a path, means for presenting said individual crystals to said source of polarized light, a magnetic field parallel to and coinciding with said path of polarized light, means for orienting said individual crystals with their optic axes parallel to and in the path of polarized light, means for registering the direction of rotation of the plane of polarized light transmitted through said individual crystals, and means for moving the individual crystals to a selected position in response to said registration.

5. In apparatus for isolating optically active crystals from a mixture of crystals, the combination of: a conveyor, means for separating individual crystals from said mixture and depositing said crystals on said conveyor, a light source on one side of said conveyor, a polarizer prism interposed between said light source and said conveyor, a photoelectric cell on the other side of said conveyor, an analyzer prism interposed between said conveyor and said photoelectric cell, said light source adapted to direct a path of light transversely of and intersecting the upper run of said conveyor, and said prisms and said photoelectric cell being aligned with said path of light, and means for moving said individual crystals to a selected position in response to signals from said photoelectric cell.

6. In apparatus for isolating optically active crystals from a mixture of crystals, the combination of: a conveyor, means for separating individual crystals from said mixture and depositing said crystals on said conveyor, a light source on one side of said conveyor, a polarizer prism interposed between said light source and said conveyor, a photoelectric cell on the other side of said conveyor, an analyzer prism interposed between said conveyor and said photoelectric cell, said light source adapted to direct a path of light transversely of and intersecting the upper run of said conveyor, said prisms and said photoelectric cell being aligned with said path of light, means providing a magnetic field parallel to and coinciding with said path of light, and means for moving said individual crystals to a selected position in response to signals from said photoelectric cell.

7. In apparatus for isolating optically active crystals from a mixture of crystals, the combination of: a conveyor, means for separating individual crystals from said mixture and depositing said crystals on said conveyor, a light source on one side of said conveyor, a polarizer prism interposed between said light source and said conveyor, a photoelectric cell on the other side of said conveyor, an analyzer prism interposed between said conveyor and said photoelectric cell, said light source adapted to direct a path of light transversely of and intersecting the upper run of said conveyor, said prisms and said photoelectric cell being aligned with said path of light, means for orienting said individual crystals so that they are presented to said path of light with their optic axes parallel to and coinciding with said path of light, and means for moving said individual crystals to a selected position in response to signals from said photoelectric cell.

8. In apparatus for isolating optically active crystals from a mixture of crystals, the combination of: a conveyor, means for separating individual crystals from said mixture and depositing said crystals on said conveyor, a light source on one side of said conveyor, a polarizer prism interposed between said light source and said conveyor, a photoelectric cell on the other side of said conveyor, an analyzer prism interpsed between said conveyor and said photoelectric cell, said light source adapted to direct a path of light transversely of and intersecting the upper run of said conveyor, said prisms and said photoelectric cell being aligned with said path of light, means providing a magnetic field parallel to and coinciding with said path of light, mean for orienting said individual crystals so that they are presented to said path of light with their optic axes parallel to and coinciding with said path of light, and means for moving said individual crystals to a selected position in response to signals from said photoelectric cell.

9. In apparatus for isolating optically active crystals from a mixture of crystals, the combination of: a generally horizontal, translucent turntable mounted for rotation on a substantially vertical axis, means for rotating said table, means for separating individual crystals from said mixture and depositing said crystals on said table, means for directing a path of polarized light in a generally horizontal path parallel to and intersecting said turntable, light sensitive means aligned with said path of light, means for stopping the rotation of said turntable when an individual crystal deposited thereon has been aligned with its optic axis parallel to and coinciding with said path of light, and means for moving said individual crystal off said turntable to a selected position in response to a signal from said light sensitive means.

10. In apparatus for isolating optically active crystals from a mixture of crystals, the combination of: a generally horizontal, translucent turntable mounted for rotation on a substantially vertical axis, means for rotating said table, means for separating individual crystals from said mixture and depositing said crystals on said table, means for directing a path of polarized light in a generally horizontal path parallel to and intersecting said turntable, light sensitive means aligned with said path of light, means providing a magnetic field parallel to and coinciding with said path of light, means for stopping the rotation of said turntable when an individual crystal deposited thereon has been aligned with its optic axis parallel to and coinciding with said path of light, and means for moving said individual crystal off said turntable to a selective position in response to a signal from said light sensitive means.

11. In apparatus for isolating optically active crystals from a mixture of crystals, the combination of: a generally horizontal translucent turntable mounted for rotation on a substantially vertical axis, means for rotating said table, means for separating individual crystals from said mixture and depositing said crystals on said table, a light source on one side of said turntable, a polarizer prism interposed between said light source and said turntable, a photoelectric cell on the other side of said conveyor, an analyzer prism interposed between said turntable and said photoelectric cell, said light source being adapted to direct a path of light parallel to and intersecting said turntable and said prisms and said photoelectric cell being aligned with said path of light, means providing a magnetic field parallel to and coinciding with said path of light, means for stopping the rotation of said turntable when an individual crystal deposited thereon has been aligned with its optic axis parallel to and coinciding with said path of light, said means comprising a second source of light below said turntable, a second polarizer prism interposed between said second light source and said turntable, a second photoelectric cell above said turntable, and a second analyzer prism interposed between said turntable and said second photoelectric cell, sai dsecond light source being adapted to direct a second path of light through said turntable parallel to and coinciding with said vertical axis, and means providing a magnetic field parallel to and coinciding with said second path of light; and means for moving said individual crystal off said turntable to a selected position in response to a signal from the first said photoelectric cell.

12. In apparatus for isolating optically active crystals from a mixture, the combination of: means for separating individual crystals from said mixture, a source of polarized light, said light being emitted in a path, means for presenting said individual crystals to said source of polarized light, means for registering the direction of rotation of the plane of polarized light transmitted through said individual crystals, and air blast means for moving the individual crystals to a selected position in response to said registration.

13. In apparatus for isolating optically active crystals from a mixture, the combination of: means for separating individual crystals from said mixture, a source of polarized light, said light being emitted in a path, means for presenting said individual crystals to said source of polarized light, means for orienting said individual crystals with their optic axes parallel to and in the path of polarized light, means for registering the direction of rotation of the plane of polarized light transmitted through said individual crystals, and air blast means for moving the individual crystals to a selected position in response to said registration.

14. In apparatus for isolating optically active crystals from a mixture, the combination of: means for separating individual crystals from said mixture, a source of polarized light, said light being emitted in a path, means for presenting said individual crystals to said source of polarized light, a magnetic field parallel to and coinciding with said path of polarizd light, means for registering the direction of rotation of the plane of polarized light transmitted through said individual crystals, and air blast means for moving the individual crystals to a selected position in response to said registration.

15. In apparatus for isolating optically active crystals from a mixture, the combination of: means for separating individual crystals from said mixture, a source of polarized light, said light being emitted in a path, means for presenting said individual crystals to said source of polarized light, a magnetic field parallel to and coinciding with said path of polarized light, means for orienting said individual crystals with their optic axes parallel to and in the path of polarized light, means for registering the direction of rotation of the plane of polarized light transmitted through said individual crystals, and air blast means for moving the individual crystals to a selected position in response to said registration.

16. In apparatus for isolating optically active crystals from a mixture of crystals, the combination of: a conveyor, means for separating individual crystals from said mixture and depositing said crystals on said conveyor, a light source on one side of said conveyor, a polarizer prism interposed between said light source and said conveyor, a photoelectric cell on the other side of said conveyor, an analyzer prism interposed between said conveyor and said photoelectric cell, said light source adapted to direct a path of light transversely of and intersecting the upper run of said conveyor, and said prisms and said photoelectric cell being aligned with said path of light, and air blast means for moving said individual crystals to a selected position in response to signals from said photoelectric cell.

References Cited in the file of this patent

UNITED STATES PATENTS

| | | |
|---|---|---|
| 597,646 | Hart | Jan. 18, 1898 |
| 1,766,037 | Dawson | June 24, 1930 |
| 1,934,187 | Glasgow et al. | Nov. 7, 1933 |
| 2,332,308 | Dresser | Oct. 19, 1943 |
| 2,351,702 | Peterson | June 20, 1944 |
| 2,499,788 | Share | Mar. 7, 1950 |
| 2,597,589 | Matthias | May 20, 1952 |

FOREIGN PATENTS

| | | |
|---|---|---|
| 99,926 | Germany | Mar. 18, 1897 |

UNITED STATES PATENT OFFICE
CERTIFICATE OF CORRECTION

Patent No. 2,868,374                                                       January 13, 1959

Mannie E. Borsook et al.

It is hereby certified that error appears in the above numbered patent requiring correction and that the said Letters Patent should read as corrected below.

In the grant, lines 2, 3 and 4, for "assignors to Clinical Research Foundation, of Los Angeles, California, a corporation of California," read -- said Borsook assignor to Clinical Research Foundation, of Los Angeles, California, a corporation of California,--; line 13, for "Clinical Research Foundation, its successors" read -- Morton Alperin, his heirs or assigns, and Clinical Research Foundation, its successors --; in the heading to the printed specification, lines 5 and 6, for "assignors to Clinical Research Foundation, of Los Angeles, Calif., a corporation of California" read -- said Borsook assignor to Clinical Research Foundation, Los Angeles, Calif., a corporation of California --; column 2, line 39, for "optics" read -- optic axis --; column 7, line 21, for "interpsed" read -- interposed --; line 27, for "mean" read -- means --; column 8, line 14, for "sai dsecond" read -- said second --.

Signed and sealed this 23rd day of June 1959.

(SEAL)
Attest:

KARL H. AXLINE                                              ROBERT C. WATSON
Attesting Officer                                     Commissioner of Patents